United States Patent
Takahashi

[11] 3,938,883
[45] Feb. 17, 1976

[54] WIDE ANGLE LENS SYSTEM

[75] Inventor: Yasuo Takahashi, Tokyo, Japan

[73] Assignee: Asahi Kogaku Kogyo Kabushiki Kaisha, Tokyo, Japan

[22] Filed: Apr. 29, 1975

[21] Appl. No.: 572,866

[30] Foreign Application Priority Data
May 8, 1974 Japan................................ 49-50954

[52] U.S. Cl.................................. 350/214; 350/176
[51] Int. Cl.²...................... G02B 9/64; G02B 13/04
[58] Field of Search...................................... 350/214

[56] References Cited
UNITED STATES PATENTS

| | | | |
|---|---|---|---|
| 3,635,546 | 1/1972 | Mori.................................... | 350/214 |
| 3,832,037 | 8/1974 | Nakagawa............................ | 350/214 |
| 3,870,400 | 3/1975 | Yamashita et al.................. | 350/214 |

*Primary Examiner*—John K. Corbin
*Attorney, Agent, or Firm*—Marn & Jangarathis

[57] ABSTRACT

There is disclosed a retrofocus type wide angle lens system having a back focus about 1.6 times as large as the focal length of the lens.

1 Claim, 2 Drawing Figures

WIDE ANGLE LENS SYSTEM

BACKGROUND OF THE INVENTION

This invention relates to a wide angle lens system, and more particularly to a retrofocus type wide angle lens system.

There is a current tendency to provide lens systems for increasingly wider angle photographing in compact sizes.

OBJECTS OF THE INVENTION

It is an object of the present invention to provide a novel retrofocus type wide angle lens system.

Another object of the present invention is to provide a novel retrofocus type wide angle lens system which is compact in size and of reduced total length.

SUMMARY OF THE INVENTION

These and other objects of the present invention are achieved by providing a retrofocus type wide angle lens system having a back focus about 1.6 times as large as the focal length of the lens.

BRIEF DESCRIPTION OF THE DRAWINGS

A better understanding of the present invention as well as other objects and advantages thereof will become apparent from the detailed disclosure thereof taken with the accompanying drawings wherein.

DETAILED DESCRIPTION OF THE INVENTION

Figure 1:
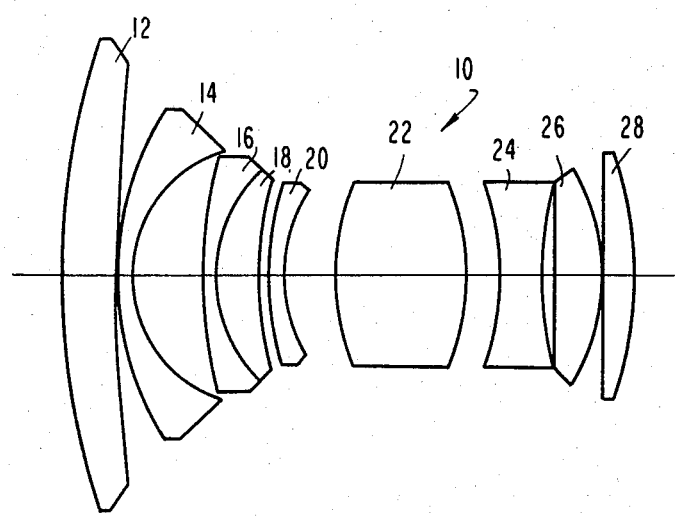
FIG. 1 illustrates the lens arrangement for the retrofocus type wide angle lens system of the present invention.

The wide angle lens system of the present invention is composed of 9 elements in 8 groups. Referring to FIG. 1, there is illustrated the lens system, generally indicated as 10, comprised of a first lens 12 which is a positive lens having a face of larger curvature turned towards the subject side; a second lens 14 which is in light communication with lens 12 and which is a negative meniscus lens having a face of larger curvature turned towards the image side; a third lens 16 which is in light communication with lens 14 and which is a negative meniscus lens having a face of larger curvature bonded to a fourth lens 18 which is in light communication with lens 16 and which is a positive meniscus lens; a fifth lens 20 which is in light communication with lens 18 and which is a negative meniscus lens having a face of larger curvature turned towards the image side; a sixth lens 22 which is in light communication with lens 20 and which is a positive biconvex lens; a seventh lens 24 which is in light communication with lens 22 and which is a negative biconcave lens; an eighth lens 26 which is in light communication with lens 24 and which is a positive meniscus lens having a face of larger curvature turned towards the image side; and a ninth lens 28 which is in light communication with lens 26 and which is a positive lens. The first to fifth lens 10 to 22 comprise a front lens group of the negative retrofocus type.

The wide angle lens system of the foregoing construction is provided with the following features:

(1) $\dfrac{F}{0.22} < F_1 < \dfrac{F}{0.12}$ (2) $\dfrac{F}{1.75} < |F_{1.2.3.4.5}| < \dfrac{F}{1.35}$, $F_{1.2.3.4.5} < 0$ (3) $0.05 < n_3 - n_4 < 0.15$, $8 < \nu_3 - \nu_4 < 15$ (4) $\dfrac{F}{0.85} < F_{1.2.3.4.5.6} < \dfrac{F}{0.6}$ (5) $1.5 < \dfrac{n_8 + n_9}{2} < 1.75$, $50 < \dfrac{\nu_8 + \nu_9}{2} < 62$ wherein F is the composite focal length of the total lens system;

$F_{1, 2, \ldots, i}$ is the composite focal length of the lens group consisting of 1st to $i$th lenses;

$r_j$ is the radius of curvature of $j$th lens face;

$d_k$ is the $k$th spacing or lens thickness;

$n_i$ is the d-line refractive index of $i$th lens; and $\nu_i$ is the Abbe number of $i$th lens.

Condition (1) is for correcting distortion and for making the wide angle lens system compact. In a wide angle lens system having a back focus about 1.6 or more times as large as its focal length, it is not preferred to use an excessively strong lens as the first lens since this necessitates an increased negative power to obtain an increased back focus and readily brings about disadvantages, such as the reduction in Petzval's sum. It is desired therefore that $F_1$ is larger than $F/0.22$. On the other hand, $F_1$ having a larger value than $F/0.12$, although advantageous for attaining a long back focus, is not preferred in that it cannot eliminate the difficulty in correcting distortion. Additionally, the use of $F_1$ in such a range makes it meaningless to arrange positive lenses.

Condition (2) represents the arrangement of the main lens group of lenses 10 to 22 and the combination of lens powers in the main lens group as required for obtaining a desired back focus. Although advantageous for obtaining a desired back focus, a condition of $$F_{1.2.3.4.5} < 0, \quad |F_{1.2.3.4.5}| < \dfrac{F}{1.75}$$

will put an increased burden on the positive lenses included in subsequent lens groups so that it will become useless to use a single lens as the sixth lens. To increase the value of $|F_{1.2.3.4.5}|$ increase the size of entire lens system. This is contrary to the purpose of making a compact lens system. It is not preferred either to increase the value of $|F_{1.2.3.4.5}|$, since it will readily lead to a reduction of Petzval's sum and an increase of comatic aberration. On the other hand, when $|F_{1.2.3.4.5}|$ is larger than $F/1.35$, it is difficult to obtain a desired back focus unless the lenses are rearranged at increased intervals. This also is contrary to a compact lens system.

Condition (3) is for maintaining the effect which results from imparting a negative power to the third lens 16 and at the same time for maintaining a proper distribution of color aberration. If an excessively large stress is placed on the effect of the negative lenses by imparting excessively different refractive indices, then the negative lenses with a large $\nu$-value will be reduced in number. This will necessitate the use of positive lenses with a small $\nu$-value for achromatization purpose, which in turn will make it difficult to blend appropriately the glass material.

Condition (4) represents the positive power of sixth lens 22 in comparison with the composite negative power of the first to fifth lenses as defined above with reference to condition (2). A composite focal length $F_{1,2,3,4,5,6}$ shorter than $F/0.85$ is not preferred because in such case an excessively large burden will be placed upon the sixth lens to correct various aberrations, increasing the coma aberration, reducing Petzval's sum and destroying the balance between various aberrations. On the other hand, when $F_{1,2,3,4,5,6}$ exceeds $F/0.55$, the sixth lens presents only a reduced effect of a positive lens, which has an adverse influence over the entire lens system.

In a bright wide angle lens having a brightness in the range of 1:2.8, condition (5) is necessary for maintaining the spherical and other aberrations at values appropriate to that lens brightness and also for maintaining a proper balance of the chromatic aberration. When the average refractive index is less than 1.55, it is difficult to maintain said various aberrations at proper values. Besides the average refraction index in such range will increase Petzval's sum. Judging from blending the glass material, however, such average refractive index is advantageous because it facilitates the removal of chromatic aberration as long as the average $\nu$-value can be maintained above 50.

Although advantageous for correcting the chromatic aberration, the average refractive index exceeding 1.75 is not preferred when the $\nu$-value, convenience of mass-production, and increased cost of the glass material are considered.

Figure 2:
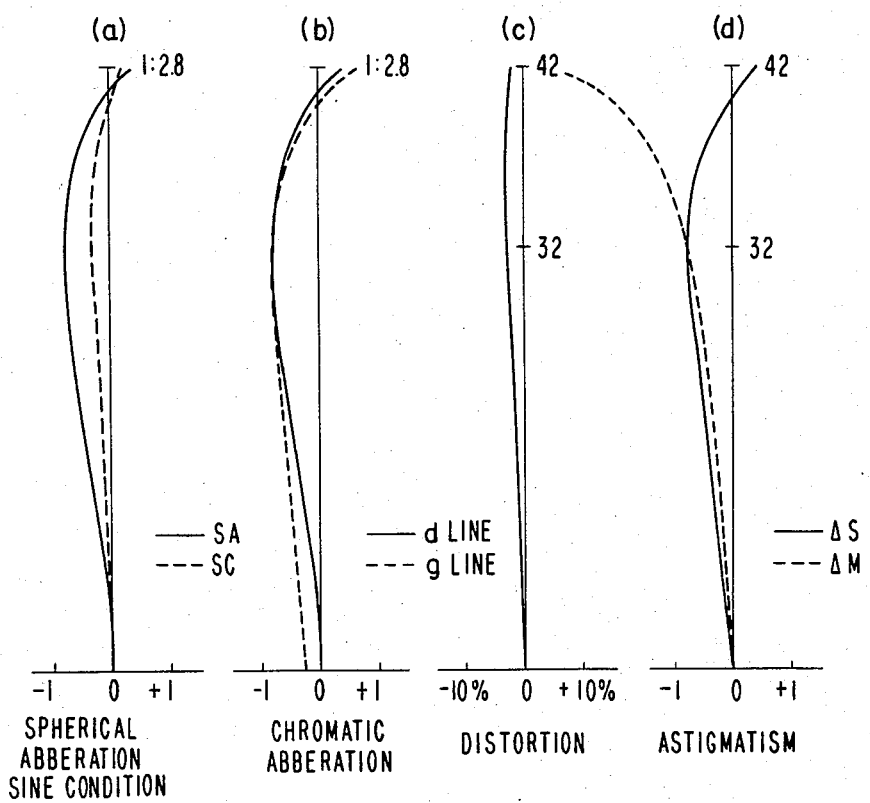
FIG. 2 illustrates various aberration curves of the lens system of the present invention.

FIG. 2 illustrates representative curves for spherical aberration, sine condition; chromatic aberration; distortion; and astigmatism; respectively.

EXAMPLE

The following is an example of a wide angle lens system according to one embodiment of the present invention:

| | F=100 | | | | | |
|---|---|---|---|---|---|---|
| $r_1$ | 246.8 | $d_1$ | 19.2 | $n_1$ 1.71300 | $\nu_1$ | 54.0 |
| $r_2$ | 604.7 | $d_2$ | 0.4 | | | |
| $r_3$ | 103.5 | $d_3$ | 6.1 | $n_2$ 1.62041 | $\nu_2$ | 60.3 |
| $r_4$ | 43.6 | $d_4$ | 23.1 | | | |
| $r_5$ | 183.0 | $d_5$ | 4.1 | $n_3$ 1.78590 | $\nu_3$ | 44.2 |
| $r_6$ | 47.5 | $d_6$ | 15.8 | $n_4$ 1.67270 | $\nu_4$ | 32.1 |
| $r_7$ | 172.8 | $d_7$ | 2.0 | | | |
| $r_8$ | 111.4 | $d_8$ | 5.3 | $n_5$ 1.64250 | $\nu_5$ | 58.4 |
| $r_9$ | 53.0 | $d_9$ | 18.5 | | | |
| $r_{10}$ | 113.5 | $d_{10}$ | 43.2 | $n_6$ 1.74320 | $\nu_6$ | 49.4 |
| $r_{11}$ | −91.2 | $d_{11}$ | 10.7 | | | |
| $r_{12}$ | −126.2 | $d_{12}$ | 16.0 | $n_7$ 1.80518 | $\nu_7$ | 25.4 |
| $r_{13}$ | 171.9 | $d_{13}$ | 5.5 | | | |
| $r_{14}$ | −563.0 | $d_{14}$ | 14.3 | $n_8$ 1.52307 | $\nu_8$ | 58.4 |
| $r_{15}$ | −65.3 | $d_{15}$ | 0.4 | | | |
| $r_{16}$ | 34680.0 | $d_{16}$ | 10.8 | $n_9$ 1.69680 | $\nu_9$ | 55.7 |
| $r_{17}$ | −146.9 | | | | | |

$$F_1 = 571.4 = \frac{F}{0.175}$$

$$F_{1,2,3,4,5} = -65.4 = -\frac{F}{1.53}$$

$$F_{1,2,3,4,5,6} = 149.3 = \frac{F}{0.67}$$

While the invention has been described in connection with one exemplary embodiment thereof, it will be understood that many modifications will be apparent to those of ordinary skill in the art; and that this application is intended to cover any adaptations or variations thereof. Therefore, it is manifestly intended that this invention be only limited by the claim and the equivalents thereof.

What is claimed is:

1. A retrofocus type wide angle lens system which comprises:
   a first positive lens;
   a second negative meniscus lens having a face of larger curvature towards the image side and being in light communication with said first lens;
   a third negative meniscus lens having a face of larger curvature towards the image side and being in light communication with said second lens;
   a fourth positive lens bonded to said face of larger curvature of said third lens and being in light communication with said third lens;
   a fifth negative meniscus lens having a face of larger curvature towards the image side and being in light communication with said fourth lens;
   a sixth positive lens in light communication with said fifth lens;
   a seventh negative lens in light communication with said sixth lens;
   an eighth positive meniscus lens having a face of larger curvature towards the image side and being in light communication with said seventh lens;
   a ninth positive lens being in light communication with said eighth lens, said lens system satisfying the following conditions:

(1) $\dfrac{F}{0.22} < F_1 < \dfrac{F}{0.12}$ (2) $\dfrac{F}{1.75} < F_{1,2,3,4,5} < \dfrac{F}{1.35}, F_{1,2,3,4,5} < 0$ (3) $0.05 < n_3 - n_4 < 0.15, 8 < \nu_3 - \nu_4 < 15$ (4) $\dfrac{F}{0.85} < F_{1,2,3,4,5,6} < \dfrac{F}{0.6}$ (5) $1.5 < \dfrac{n_8 + n_9}{2} < 1.75, 50 < \dfrac{\nu_8 + \nu_9}{2} < 62$ wherein F equals 100 and is the composite focal length of the total lens system;
$F_{1,2,\ldots,i}$ is the composite focal length of the lens group consisting of 1st to $i$th lenses;
$r_j$ is the radius of curvature of $j$th lens face;
$d_k$ is the $k$th spacing or lens thickness;
$n_i$ is the d-line refractive index of $i$th lens;
$\nu_i$ is the Abbe number of $i$th lens;

| | | | | | | |
|---|---|---|---|---|---|---|
| $r_1 =$ | 246.8 | $d_1 =$ | 19.2 | $n_1$=1.71300 | $\nu_1$=54.0 | |
| $r_2 =$ | 604.7 | $d_2 =$ | 0.4 | | | |
| $r_3 =$ | 103.5 | $d_3 =$ | 6.1 | $n_2$=1.62041 | $\nu_2$=60.3 | |
| $r_4 =$ | 43.6 | $d_4 =$ | 23.1 | | | |
| $r_5 =$ | 183.0 | $d_5 =$ | 4.1 | $n_3$=1.78590 | $\nu_3$=44.2 | |
| $r_6 =$ | 47.5 | $d_6 =$ | 15.8 | $n_4$=1.67270 | $\nu_4$=32.1 | |
| $r_7 =$ | 172.8 | $d_7 =$ | 2.0 | | | |
| $r_8 =$ | 111.4 | $d_8 =$ | 5.3 | $n_5$=1.64250 | $\nu_5$=58.4 | |
| $r_9 =$ | 53.0 | $d_9 =$ | 18.5 | | | |
| $r_{10}=$ | 113.5 | $d_{10}=$ | 43.2 | $n_6$=1.74320 | $\nu_6$=49.4 | |
| $r_{11}=$ | −91.2 | $d_{11}=$ | 10.7 | | | |
| $r_{12}=$ | −126.2 | $d_{12}=$ | 16.0 | $n_7$=1.80518 | $\nu_7$=25.4 | |
| $r_{13}=$ | 171.9 | $d_{13}=$ | 5.5 | | | |
| $r_{14}=$ | −563.0 | $d_{14}=$ | 14.3 | $n_8$=1.52307 | $\nu_8$=58.4 | |
| $r_{15}=$ | −65.3 | $d_{15}=$ | 0.4 | | | |
| $r_{16}=$ | 34680.0 | $d_{16}=$ | 10.8 | $n_9$=1.69680 | $\nu_9$=55.7 | |
| $r_{17}=$ | −146.9 | | | | | |

-continued $$F_1 = 571.4 = \frac{F}{0.175}$$

$$F_{1,2,3,4,5} = -65.4 = -\frac{F}{1.53}$$

-continued $$F_{1,2,3,4,5,6} = 149.3 = \frac{F}{0.67}$$

* * * * *